Patented Apr. 13, 1948

2,439,440

UNITED STATES PATENT OFFICE 2,439,440

METHOD OF MAKING DISINFECTANT HYDRAULIC CEMENT

Charles Rhodimer Amberg and William John Knapp, Alfred, N. Y., assignors to North American Cement Corporation, Catskill, N. Y., a corporation of Delaware No Drawing. Application October 7, 1942, Serial No. 461,228

2 Claims. (Cl. 106—15)

This invention relates to a disinfectant hydraulic cement.

It is customary to keep the walls and floors of hospitals, dairies, chicken-houses, slaughterhouses, gymnasiums, shower rooms, swimming pool rooms, public rest rooms, and the like in an antiseptic or aseptic condition by frequently washing with a disinfectant solution. When these walls and floors are made of concrete the surfaces are generally treated to make them impervious to liquids, in order to limit bacteria and fungi to the surface. If the surfaces are rendered truly impervious to liquids the walls and floors may be kept in an aseptic condition by treatment with appropriate disinfectant preparations. But the rendering of concrete surfaces impervious to liquids is difficult and involves considerable expense. It is an object of this invention to provide a hydraulic disinfectant cement for producing concrete which makes it possible to maintain aseptic conditions in hospitals, dairies, barns and the like containing concrete walls or floors without the added expense and uncertainty incident to rendering such concrete surfaces impervious to water and without the continuing expense of frequent washing with disinfectant solutions.

In the development of a disinfectant cement the disinfecting agent must not interfere seriously with the setting and hardening of the cement and must not materially adversely affect the strength and the set of the concrete. Other factors to be considered in the production of satisfactory disinfectant cement include the toxic effect of such cements upon humans, the permanence of the disinfecting effect, the compatibility of the disinfecting agent with the cement and with the concrete mix prior to, during and after the set. It is desirable also to have a disinfectant cement toxic to both bacteria and fungi.

It is an object of the present invention to provide a disinfectant hydraulic cement which is easily prepared and is stable in storage. It is another object of the invention to produce a concrete material of high compressive and tensile strength possessing disinfecting properties. Yet another object of the invention is to provide a disinfectant cement which does not seriously adversely affect the set of the concrete incorporating the disinfectant cement. Still another object of the invention is to provide a self-disinfecting cement which is non-toxic to humans. Other objects of the invention will be apparent from the more detailed description which follows.

We have found that the foregoing objectives can be obtained through the utilization of a hydraulic cement incorporating a halogenated phenol, especially polyhalogenated phenols, such as tetra- and pentachlorophenols. A more permanent disinfecting property can be produced with the halogenated phenols themselves although their salts may be used to somewhat less advantage. The chlorinated phenols are preferred due to their ready availability. Yet, it should be understood that other halogenated phenols, such as triiodo- or tetrabromophenols may be used.

The disinfectant agents may be advantageously mixed with the cement in an effective dosage during the grinding of the clinker or immediately thereafter. When pentachlorophenol is used to impart disinfecting properties, it is advantageously introduced during the grinding of the cement where it serves also as a grinding aid and when mortars or concrete mixes are made with the cement obtained, the pentachlorophenol increases the plasticity of said mixes. The resulting disinfectant cement is stable in storage and may be marketed in the same manner as untreated hydraulic cements for the purpose of making a disinfectant concrete. The introduction of the disinfectant into the cement prior to making the concrete mix has considerable advantage, due to the fact that builders and masons may construct buildings with walls and floors having disinfecting properties by following their usual practices without having or procuring a knowledge of the problems of the disinfectant arts. Nevertheless, the disinfecting agents of the present invention may be incorporated in the concrete during the mixing operation or the finished concrete may be impregnated with the disinfectant.

The halogenated phenols may be utilized in the cements in proportions which are adequate to impart a relatively permanent and continuously disinfectant action. For instance, a Portland cement containing 10 parts of pentachlorophenol to 1000 parts of the cement has been found to possess excellent disinfectant properties. Smaller percentages of pentachlorophenol while not fully effective impart a decided disinfectant property to cement. Even as little as 0.1% pentachlorophenol imparts a discernible disinfectant action. As much as 3% of pentachlorophenol has been incorporated in a Portland cement without materially adversely affecting the concrete made therefrom, but 1% or less of pentachlorophenol is usually adequate. Somewhat greater quantities than 3% pentachlorophenol may be used, but the strength, and the initial and the final sets of the concrete begin to be adversely affected.

Concrete made from a disinfecting cement containing pentachlorophenol has the normal strength of ordinary concrete and, in addition, has a disinfectant action which continues over such a long period of time that it may be considered to have a permanent disinfectant action.

For example, a self-disinfecting concrete block ¾" x ¾" x ⅛" made from a concrete mixture containing a cement-to-sand ratio of one to three and having 4 parts of pentachlorophenol per 1000 parts of cement was stored in a damp closet for twenty-four hours and then immersed for two weeks in running fresh water. Thereafter, the cement block was air-dried for twenty-four hours, water saturated, and subsequently sterilized. The block was then placed in a sterilized culture dish, such as a Petri dish, and a sterilized nutrient-agar was inoculated with *Staphylococcus aureus* and introduced into the dish so as to surround but not cover the concrete block, whereupon the entire mass was subjected to incubation for twenty-four hours. After the period of incubation, bacterial growth was readily discernible in the nutrient-agar but a definite aseptic zone free of growing bacteria was observed around the concrete block. A number of tests showed that the aseptic zone averaged about 5 mm.

In another test of the effectiveness of the disinfectant properties of concrete made from our disinfectant cement, a hole 2" deep by 6" by 6" was chipped in the concrete shower room floor of a university field house and filled with a concrete made with three parts of sand to one part of a 0.4% pentachlorophenol Portland cement. After the concrete had set, the shower room was used by students over a period of time. A definite area of the disinfectant concrete was swabbed with a sterile swab and a bacteria count taken in accordance with standard procedure. Then a similar and identical area of the untreated floor was swabbed in the same manner and the corresponding tests made. Several tests showed that the disinfectant concrete patch gave a maximum bacteria and fungi count of 600 per square inch, while the regular concrete gave an average count of 35,000 per square inch. Thus, the disinfectant patch showed a significant reduction in the bacterial numbers.

In another use of our invention, a concrete floor, varying in thickness from 2" to 4½" was laid in a pasteurizing room of a dairy. The floor was 16' by 16' in size and was divided equally between regular concrete and a disinfectant concrete. One-half of the floor was made with a concrete having one part of 0.4% pentachlorophenol cement, one part of sand and two parts of pea-gravel, all by weight, while the other half of the floor was constructed with the same concrete mix with the exception of the pentachlorophenol. After using the floor for more than a week, similar sections of the treated and untreated flooring of identical area were tested in the same manner as that used in testing the gymnasium floor. A series of four tests per day for 10 different days, over a period of approximately three weeks, showed a ratio of bacteria numbers on disinfectant concrete to those on untreated concrete of 1 to 5.4. Thus, the bacteria and fungi growths were markedly inhibited by the disinfectant cement, as compared to the untreated cement.

In another test, a platform, 4" high, was laid in front of the pasteurizer in such a position that the men working on the pasteurizer would stand on it, and a certain amount of milk spillage would occur on it. This platform consisted of a checker-board of 9" tile, consisting of four concrete tiles containing 0.8% pentachlorophenol cement, four concrete tiles containing 1.0% pentachlorophenol cement, and four tiles containing regular Portland cement. Each tile in the platform was swabbed, and bacterial counts made, four times each week, for a period of one month. The total number of days on which tests were made was 15. The average of all the individual tests showed a ratio of bacteria on the respective types of tile to be:

1.0% pentachlorophenol tile _____ 1
0.8% pentachlorophenol tile _____ 2.1
Untreated Portland cement _____ 3.3

In other words, 1.0% pentachlorophenol cement gave a bacterial reduction of 67% as compared to untreated cement.

To determine the toxic effect of the disinfectant cement upon humans, a daily application of a 0.4% pentachlorophenol cement was made against the skin of the human forearm, and was held in place by means of a bandage. Applications totalling fifty-two hours of contact time showed no toxic effect. White mice were caused to breathe dust of same pentachlorophenol cement in a closed box for 14 days. The mice continued in good health and an examination of their lungs after dissecting indicated a healthy condition. These tests indicate that the disinfectant hydraulic cements of the present invention are not toxic to humans and may be used in the same manner as untreated cements.

The halogenated phenols may be incorporated with hydraulic cement in combination with a material, such as an inorganic salt of a high molecular weight fatty acid, to increase the life of the disinfectant action. For instance, Portland cement containing 4 parts of pentachlorophenol and 1 part of a soluble metallic salt of stearic acid, such as a sodium or potassium salt, to 1000 parts of cement, showed a bacteria-free zone in the agar-plate test, using *Staphylococcus aureus*, of six millimeters after 44 days of water washing. Portland cement containing 0.4% pentachlorophenol alone, after only 13 days of water washing, showed a bacteria-free zone of five millimeters in the same test. This shows that the incorporation of an inorganic salt of a high molecular weight fatty acid in Portland cement with a halogenated phenol increases the life of the disinfectant action.

It should be understood that the foregoing description comprises preferred embodiments of the invention and is included to illustrate the practice of the invention. Many variations and modifications may be made in the illustrative embodiments without departing from the spirit of the invention or its scope which is defined in the appended claims.

We claim:

1. The method of making a disinfectant cement for forming concrete structures without materially adversely affecting the set-up and strength of said concrete which comprises mixing between about 0.1% and about 3% of pentachlorophenol with cement clinkers prior to the grinding, using said pentachlorophenol as a grinding aid, and leaving the pentachlorophenol in the cement to act as a plasticizer and disinfecting agent in the final cement.

2. The method of making a disinfectant concrete for forming concrete structures without materially adversely affecting the set-up and strength of said concrete which comprises mixing from 0.1% to 3% of pentachlorophenol with the cement clinkers prior to the grinding thereof, grinding the clinkers and the pentachlorophenol together to form a relatively homogeneous disinfectant cement and mixing said disinfectant cement with aggregate and water to form a disinfectant concrete.

CHARLES RHODIMER AMBERG.
WILLIAM JOHN KNAPP.

REFERENCES CITED

The following references are of record in the file of this patent:

UNITED STATES PATENTS

| Number | Name | Date |
|---|---|---|
| 2,267,101 | Heuter | Dec. 23, 1941 |
| 2,138,805 | Halvorson et al. | Nov. 29, 1938 |
| 1,421,914 | Coleman | July 4, 1922 |
| 446,285 | Fottrell | Feb. 10, 1891 |

FOREIGN PATENTS

| Number | Country | Date |
|---|---|---|
| 513,366 | Great Britain | Oct. 11, 1939 |
| 8,504 | Great Britain | 1904 |
| 11,209 | Great Britain | 1891 |
| 425,286 | France | Apr. 1, 1911 |

OTHER REFERENCES

Industrial and Engineering Chemistry, Nov. 1939, pp. 1431–1435.